(12) United States Patent
Kamei et al.

(10) Patent No.: US 10,193,653 B2
(45) Date of Patent: Jan. 29, 2019

(54) POLARIZATION MULTIPLEXING OPTICAL TRANSMISSION CIRCUIT AND POLARIZATION MULTIPLEXING OPTICAL TRANSMISSION AND RECEPTION CIRCUIT

(71) Applicant: NIPPON TELEGRAPH AND TELEPHONE CORPORATION, Chiyoda-ku, Tokyo (JP)

(72) Inventors: Shin Kamei, Atsugi (JP); Makoto Jizodo, Atsugi (JP); Hiroshi Fukuda, Atsugi (JP); Kiyofumi Kikuchi, Atsugi (JP); Ken Tsuzuki, Atsugi (JP)

(73) Assignee: Nippon Telegraph and Telephone Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/564,269

(22) PCT Filed: Apr. 12, 2016

(86) PCT No.: PCT/JP2016/001991
§ 371 (c)(1),
(2) Date: Oct. 4, 2017

(87) PCT Pub. No.: WO2016/166971
PCT Pub. Date: Oct. 20, 2016

(65) Prior Publication Data
US 2018/0139007 A1    May 17, 2018

(30) Foreign Application Priority Data

Apr. 13, 2015    (JP) .................... 2015-082081

(51) Int. Cl.
*H04J 14/06*    (2006.01)
*H01S 5/022*    (2006.01)
(Continued)

(52) U.S. Cl.
CPC .............. *H04J 14/06* (2013.01); *H01S 5/022* (2013.01); *H04B 10/516* (2013.01); *H04J 14/00* (2013.01); *H04J 14/04* (2013.01)

(58) Field of Classification Search
CPC ........ H04J 14/02; H04J 14/06; H04B 10/505; H04B 10/532; H04B 10/40; H04B 10/516;
(Continued)

(56) References Cited

U.S. PATENT DOCUMENTS

2003/0058499 A1    3/2003   Reingand et al.
2010/0303469 A1*  12/2010  Barton ................. H04B 10/505
                                                                 398/184
(Continued)

FOREIGN PATENT DOCUMENTS

| CN | 102045127 A | 5/2011 |
|---|---|---|
| JP | 2010-156842 A | 7/2010 |
| WO | 2014/141685 A1 | 9/2014 |

OTHER PUBLICATIONS

C, Doerr et al., *Single-Chip Silicon Photonics 100-Gb/s Coherent Transceiver*, Optical Fiber Communications Conference and Exhibition (OFC), 2014, pp. 3.

(Continued)

*Primary Examiner* — Hanh Phan
(74) *Attorney, Agent, or Firm* — Workman Nydegger (57) ABSTRACT

A one chip-integrated digital coherent polarization multiplexing optical transmission and reception circuit with optimal optical power distribution between sending and receiving is provided by using an optical power splitter having a branching ratio of a lower asymmetry property so that the unbalanced loss depending on the polarization path can be compensated. A polarization multiplexing optical transmission and reception circuit includes a polarization multiplexing optical transmission circuit, including: the first optical (Continued)

power splitter for branching the optical power of continuous light outputted from a light source; one polarization optical modulation circuit at the side of a path having a higher loss connected to one output of the first optical power splitter; the second optical power splitter connected to the other output of the first optical power splitter; and the other polarization optical modulation circuit connected to one output of the second optical power splitter.

11 Claims, 11 Drawing Sheets

(51) Int. Cl.
  *H04B 10/516* (2013.01)
  *H04J 14/00* (2006.01)
  *H04J 14/04* (2006.01)
(58) Field of Classification Search
  CPC ............... H04B 10/614; H04B 10/615; H04B 10/6166; H04B 10/5161; H04B 10/6162
  USPC ....... 398/183, 184, 185, 186, 187, 188, 192, 398/193, 194, 135, 136, 202, 204, 205, 398/206, 207, 208, 79, 82, 158, 139, 65, 398/152, 159, 138
  See application file for complete search history.

(56) References Cited

U.S. PATENT DOCUMENTS

| | | |
|---|---|---|
| 2011/0255147 A1 | 10/2011 | Oguri |
| 2012/0315043 A1 | 12/2012 | Nakagawa et al. |
| 2013/0209089 A1* | 8/2013 | Harley ............... H04B 10/5561 398/25 |
| 2015/0139649 A1* | 5/2015 | Kikuchi ................. H04J 14/06 398/65 |
| 2016/0036530 A1 | 2/2016 | Yamamoto |

OTHER PUBLICATIONS

Bo Zhang et al., *Practical Limits of Coherent Receivers for Unamplified 100 Gb/s Application*, Proceedings of OFC/NFOEC Technical Digest, 2013, pp. 3.
International Search Report dated Jun. 7, 2016, issued in PCT Application No. PCT/JP2016/001991, filed Apr. 12, 2016.
International Preliminary Report on Patentability dated Oct. 26, 2017, issued in PCT Application No. PCT/JP2016/001991, filed Apr. 12, 2016.
Office Action dated Jul. 25, 2018 in corresponding Chinese Patent Application No. 201680021855.X.
Extended Search Report dated Nov. 16, 2018 in corresponding European Patent Application No. 16779767.9.

* cited by examiner

| LOSS DIFFERENCE BETWEEN POLARIZATIONS (dB) | OPTICAL POWER BRANCHING RATIO TO THE TRANSMISSION SIDE | | | | | | |
|---|---|---|---|---|---|---|---|
| | 50% | 55% | 60% | 65% | 70% | 75% | 80% |
| 0.50 | 52.9% | 55.0% | 60.0% | 65.0% | 70.0% | 75.0% | 80.0% |
| 1.00 | 55.7% | 55.7% | 60.0% | 65.0% | 70.0% | 75.0% | 80.0% |
| 1.50 | 58.5% | 58.5% | 60.0% | 65.0% | 70.0% | 75.0% | 80.0% |
| 2.00 | 61.3% | 61.3% | 61.3% | 65.0% | 70.0% | 75.0% | 80.0% |
| 2.50 | 64.0% | 64.0% | 64.0% | 65.0% | 70.0% | 75.0% | 80.0% |
| 3.00 | 66.6% | 66.6% | 66.6% | 66.6% | 70.0% | 75.0% | 80.0% |
| 3.50 | 69.1% | 69.1% | 69.1% | 69.1% | 70.0% | 75.0% | 80.0% |
| 4.00 | 71.5% | 71.5% | 71.5% | 71.5% | 71.5% | 75.0% | 80.0% |
| 4.50 | 73.8% | 73.8% | 73.8% | 73.8% | 73.8% | 75.0% | 80.0% |
| 5.00 | 76.0% | 76.0% | 76.0% | 76.0% | 76.0% | 76.0% | 80.0% |
| 5.50 | 78.0% | 78.0% | 78.0% | 78.0% | 78.0% | 78.0% | 80.0% |

FIG.7A

| LOSS DIFFERENCE BETWEEN POLARIZATIONS (dB) | OPTICAL POWER BRANCHING RATIO TO THE TRANSMISSION SIDE | | | | | | | |
|---|---|---|---|---|---|---|---|---|
| | 50% | 55% | 60% | 65% | 70% | 75% | 80% | |
| 0.50 | 73.6% | 70.9% | 68.3% | 65.6% | 63.0% | 65.3% | 70.2% | |
| 1.00 | 72.1% | 69.3% | 66.6% | 63.8% | 61.0% | 63.9% | 68.9% | |
| 1.50 | 70.7% | 67.8% | 64.9% | 61.9% | 59.0% | 62.4% | 67.5% | |
| 2.00 | 69.3% | 66.3% | 63.2% | 60.1% | 57.1% | 60.7% | 65.9% | |
| 2.50 | 68.0% | 64.8% | 61.6% | 58.4% | 55.2% | 59.0% | 64.3% | |
| 3.00 | 66.7% | 63.4% | 60.0% | 56.7% | 53.4% | 57.2% | 62.5% | |
| 3.50 | 65.4% | 62.0% | 58.5% | 55.1% | 51.6% | 55.3% | 60.7% | |
| 4.00 | 64.2% | 38.8% | 41.6% | 44.9% | 48.7% | 46.4% | 58.7% | |
| 4.50 | 34.4% | 36.8% | 39.6% | 42.8% | 46.6% | 44.6% | 41.0% | |
| 5.00 | 32.5% | 34.8% | 37.5% | 40.7% | 44.5% | 43.0% | 39.2% | |
| 5.50 | 30.5% | 32.8% | 35.5% | 38.6% | 42.3% | 41.5% | 37.6% | |

POLARIZATION MULTIPLEXING OPTICAL TRANSMISSION CIRCUIT AND POLARIZATION MULTIPLEXING OPTICAL TRANSMISSION AND RECEPTION CIRCUIT

TECHNICAL FIELD

The present invention relates to a polarization multiplexing optical transmission circuit and a polarization multiplexing optical transmission and reception circuit. In particular, the invention relates to integrated polarization multiplexing optical transmission circuit and polarization multiplexing optical transmission and reception circuit for coherent polarization multiplexing method for which a light source is shared with an optical reception circuit.

BACKGROUND ART

In recent years, in a long-distance optical communication in particular, an optical transmission system based on a digital coherent method has been developed by which the communication capacity per one channel can be increased dramatically. Such a system has been increasingly put to commercial use. In the field of optical communication based on a digital coherent method, a polarization multiplexing method has been generally used to give separate signals to two orthogonal polarizations to double the transmission quantity.

Various signal formats have been used to give a signal to each polarization. Among such formats, the one currently most actively put to commercial use includes systems having a communication capacity of 100 gigabit/second per a channel that are mostly based on QPSK (Quadrature Phase Shift Keying).

Figure 1:
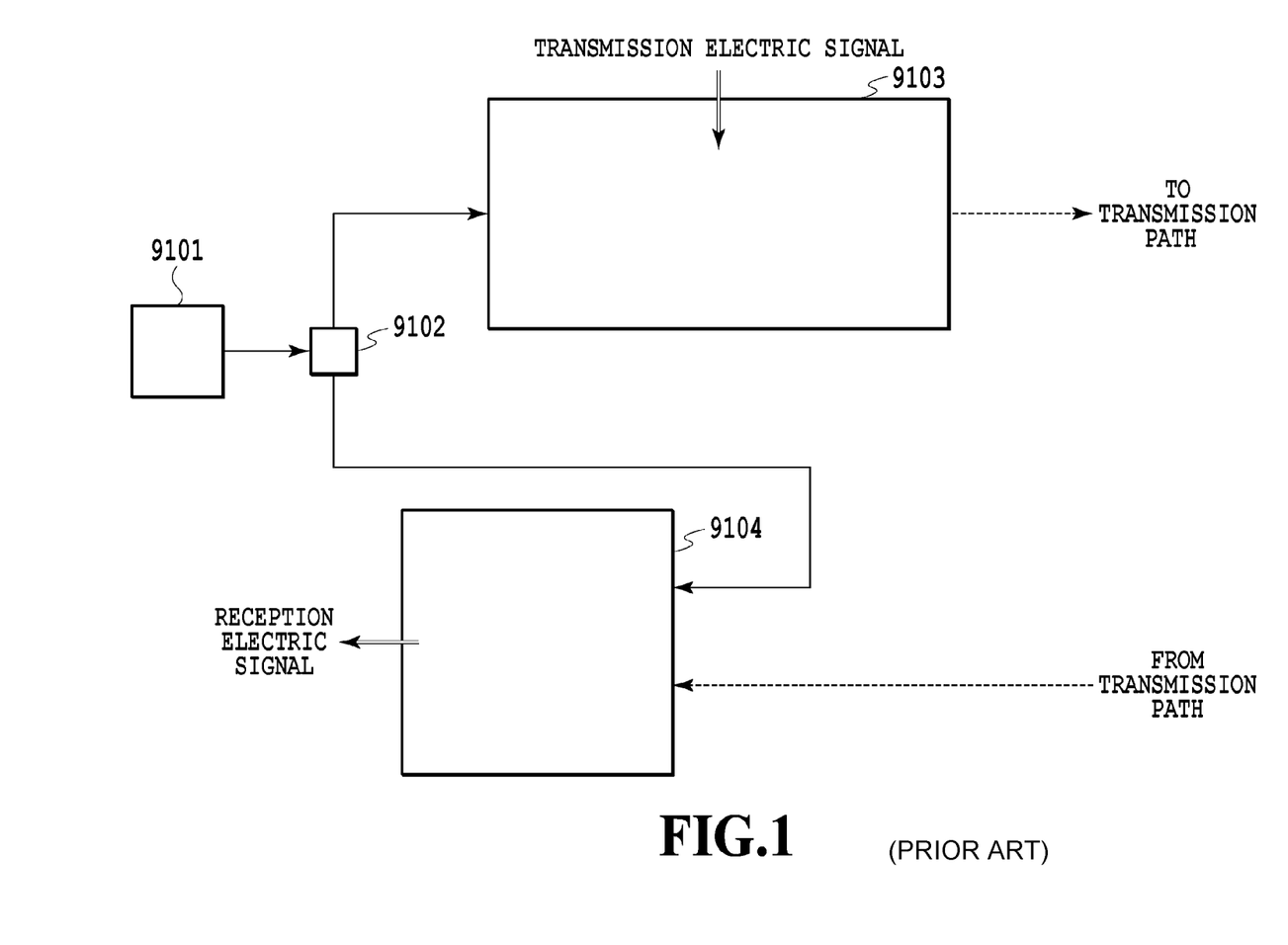
FIG. 1 illustrates the entire configuration of an optical transmission circuit and an optical reception circuit in the prior art.

FIG. 1 illustrates the entire configuration of an optical transmission circuit and an optical reception circuit based on a digital coherent polarization multiplexing QPSK method according to the prior art. FIG. 1 illustrates a light source 9101 generating continuous light, the first optical power splitter 9102, an optical modulator 9103, and an optical demodulator 9104. In FIG. 1 and the subsequent drawings, the arrow of the solid line shows continuous light, the arrow of the dotted line shows modulated signal light, and the arrow of the double line shows an input and an output of an electric signal.

An optical transmission circuit and an optical reception circuit based on the coherent method are characterized in that the reception side also has a light source. A reference light inputted from the light source at this reception side and the reception signal light inputted from the transmission path are allowed to interfere each other, thereby detecting a reception signal at a higher sensitivity. Another configuration is also possible in which separate light sources are provided at both of the transmission circuit side and the reception circuit side, respectively. However, in recent years, as shown in the conventional example of FIG. 1, such a configuration has been mainly used in which a unified light source is used by branching the light by an optical power splitter to the transmission circuit side and the reception circuit side. This configuration is advantageous in size and power consumption.

The optical modulator 9103 of FIG. 1 receives a transmission electric signal and a continuous light from the light source 9101 branched by the first optical power splitter 9102. The optical modulator 9103 functions as a polarization multiplexing optical transmission circuit to modulate the continuous light based on the transmission electric signal to send a polarization multiplexed signal light to a transmission path.

The optical demodulator 9104 of FIG. 1 receives a polarization multiplexed signal light from the transmission path and a continuous light from the light source 9101 branched by the first optical power splitter 9102. The optical demodulator 9104 functions as the polarization multiplexing optical reception circuit that performs a coherent optical demodulation processing to output a reception electric signal.

Figure 2:
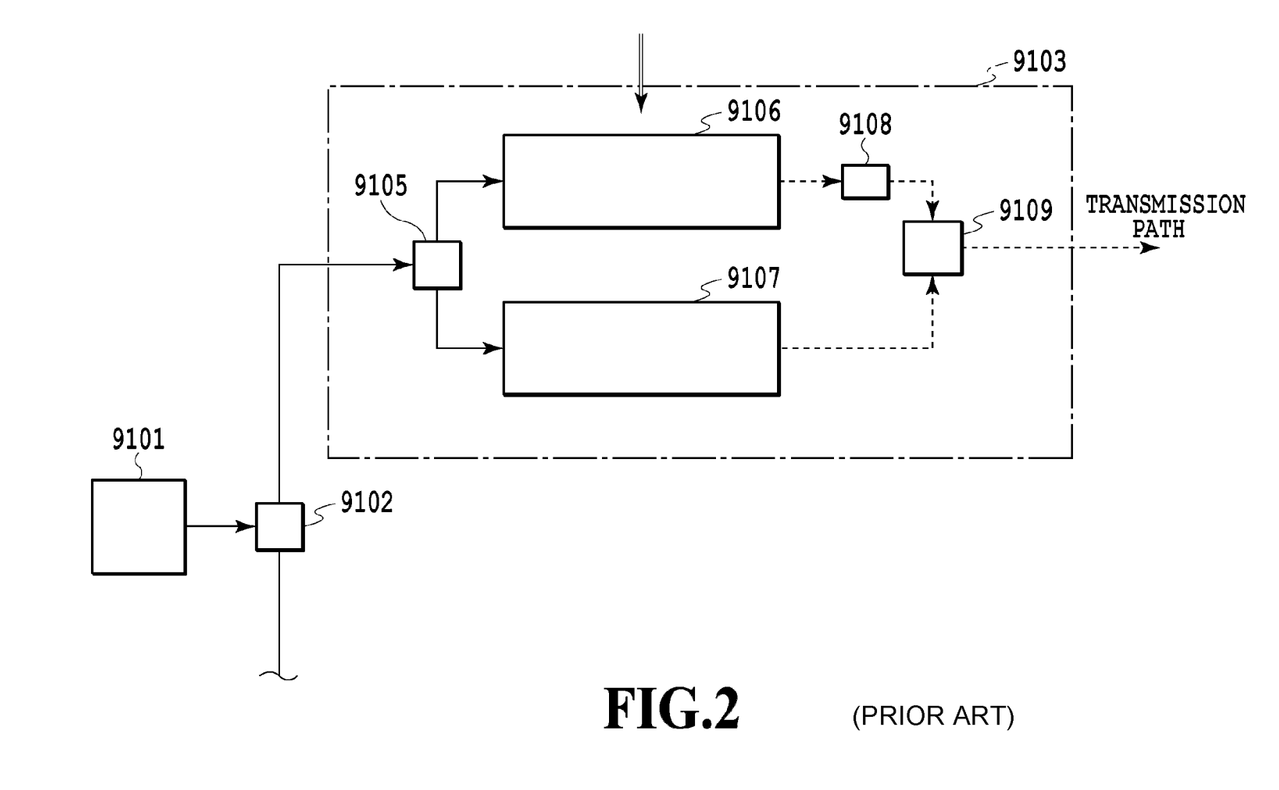
FIG. 2 illustrates the detailed configuration of the optical transmission circuit side in the prior art of FIG. 1.

FIG. 2 shows the details of the polarization multiplexing optical transmission circuit configured by the optical modulator 9103 of FIG. 1. The optical modulator 9103 has a system of two optical modulation circuits corresponding to two orthogonal polarizations. For convenience, the system of the two optical modulation circuits will be referred to as X polarization and Y polarization separate from actual polarization directions, respectively. FIG. 2 illustrates the second optical power splitter 9105, a Y polarization optical modulation circuit 9106, an X polarization optical modulation circuit 9107, a polarization rotator 9108, and a polarization beam combiner 9109.

The optical modulator 9103 receives continuous light having TE polarization for example from the first optical power splitter 9102. The inputted continuous light having TE polarization is branched to two continuous lights having TE polarization by the second optical power splitter 9105. The two continuous lights are modulated by the transmission electric signal in the Y polarization optical modulation circuit 9106 and the X polarization optical modulation circuit 9107, respectively.

The modulated TE polarization output from the Y polarization optical modulation circuit 9106 is converted to TM polarization output by the polarization rotator 9108. The converted TM polarization output and the modulated TE polarization output from the X polarization optical modulation circuit 9107 are multiplexed to a polarization multiplexed signal by the polarization beam combiner 9109. The polarization multiplexed signal is outputted to the transmission path.

Figure 3:
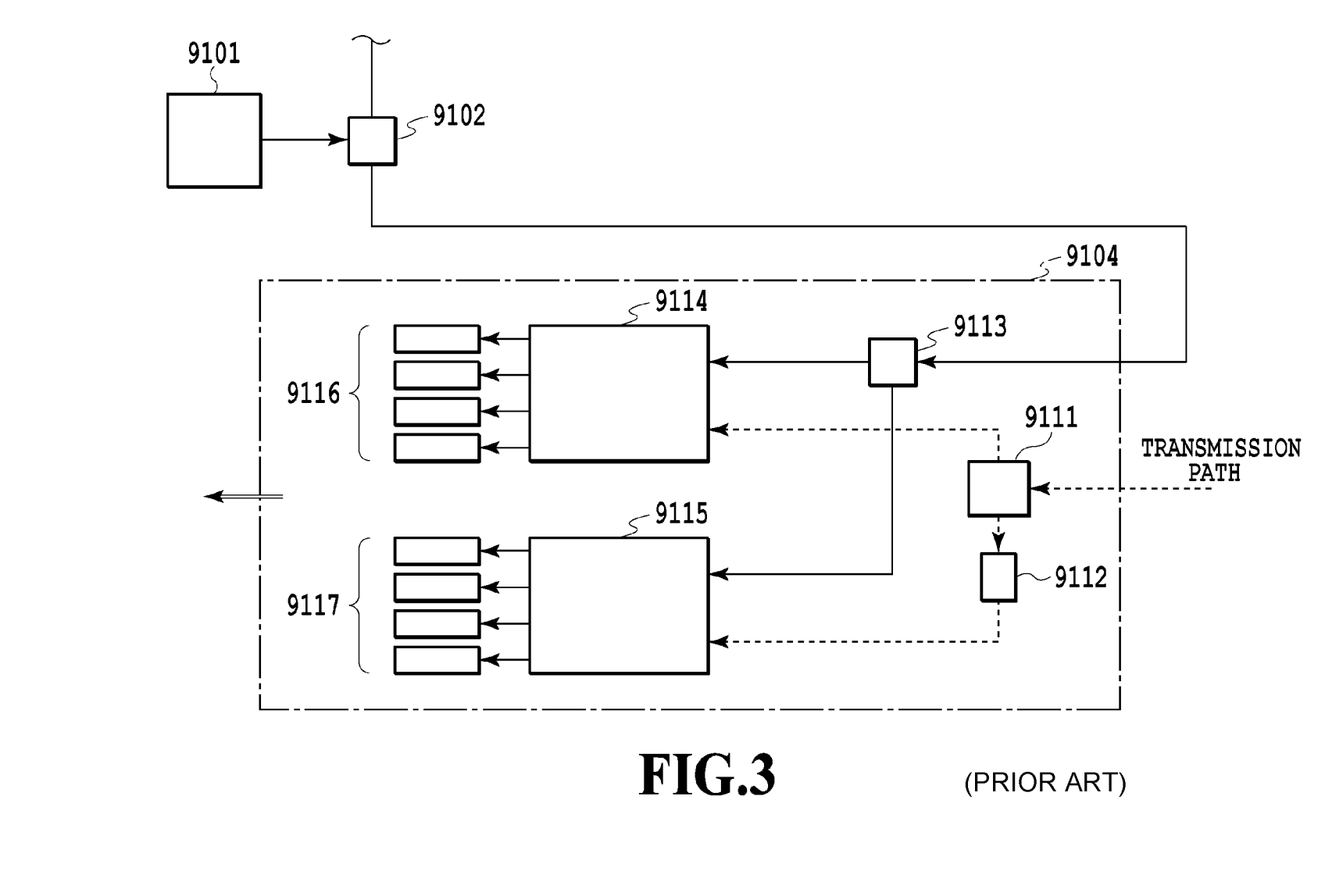
FIG. 3 illustrates the detailed configuration of the optical reception circuit side in the prior art of FIG. 1.

FIG. 3 illustrates the details of a polarization multiplexing optical reception circuit configured by the optical demodulator 9104 of FIG. 1. As in the transmission circuit side, the reception circuit side also has two optical demodulation circuits corresponding to a system of two polarizations. FIG. 3 illustrates a polarization beam splitter 9111, a polarization rotator 9112, the third optical power splitter 9113, an optical coherent mixer 9114 as the first optical demodulation circuit, an optical coherent mixer 9115 as the second optical demodulation circuit, and photo detectors 9116 and 9117.

The optical demodulator 9104 receives a polarization-multiplexed reception signal light from the transmission path. The reception signal light is separated to a TE polarization component and a TM polarization component by the polarization beam splitter 9111. The continuous light provided from the light source 9101 is branched by the first optical power splitter 9102 as a reference light of TE polarization. The reference light is further branched to two components by the third optical power splitter 9113. These two components are inputted to two optical demodulation circuits configured by the optical coherent mixers 9114 and 9115.

The TE polarization component of the reception signal light separated by the polarization beam splitter 9111 and one of the reference lights of TE polarization branched by the third optical power splitter 9113 are inputted to the optical coherent mixer 9114 and are demodulated.

The TM polarization component of the reception signal light separated by the polarization beam splitter 9111 is converted to TE polarization by the polarization rotator 9112. The reception signal light component converted to TE polarization and the other of the reference lights of TE polarization branched by the third optical power splitter 9113 are inputted to the optical coherent mixer 9115 and are demodulated.

The demodulated signal light is converted to a reception electric signal by the photo detectors 9116 and 9117. The reception electric signal is outputted from the polarization multiplexing optical reception circuit.

Under the limited power light source condition, branching ratio of the continuous light from the light source 9101 between the transmission circuit side and the reception circuit side by the first optical power splitter 9102 generally provides superior transmission and reception characteristics when distributing higher power to the transmission circuit side than to the reception circuit side instead of using equal branching. The optimization of the branching ratio is detailed in the following Non-Patent Literature 1 (see FIG. 4 and Section 3) in which an asymmetry property between the transmission side and the reception side up to about 70:30 is appropriate depending on conditions (or the transmission distance of a signal light can be maximized).

The optical transmission circuit and the optical reception circuit based on the digital coherent polarization multiplexing method as described above are required to provide a further-smaller circuit in the future. Thus, research and development have been carried out to unify and integrate transmission and reception circuits.

For this purpose, an approach has been examined to use a Photonic Integrated Circuit (PIC) using an InP (indium phosphide) light waveguide or silicon light waveguide to integrate all optical circuit elements into one chip.

Specifically, an approach has been examined to provide a PIC (Photonic Integrated Circuit) by integrating all of optical modulation circuits 9106, 9107 and the optical demodulation circuits 9114, 9115 as well as optical power splitters 9102, 9105, and 9113, polarization beam combiner/splitters 9109, 9111, and the polarization rotators 9108, 9112 into one chip. Furthermore, another approach has been examined to integrate the light source 9101 and the photo detectors 9116, 9117. This configuration obtained by one chip integration also requires an asymmetric branching ratio of about 70:30 for the first optical power splitter 9102 to branch the continuous light from the light source 9101 between the transmission and reception circuits as described above.

Another currently-inevitable disadvantage is that, when the polarization rotators 9108 and 9112 are realized by PIC for one chip integration, the polarization rotator has an excessive circuit loss of about 1 to 2 dB. This excessive circuit loss in the polarization rotator causes the optical modulator 9103 constituting the polarization multiplexing optical transmission circuit of FIG. 2 to have a higher loss in the Y polarization optical modulation circuit 9106-side path passing through the polarization rotator 9108 than in the X polarization optical modulation circuit 9107-side path.

In order to correct this unbalanced loss between paths to minimize the loss of the entire optical modulator, the second optical power splitter 9105 also requires an asymmetric branching ratio at which a higher power is branched to the Y polarization optical modulation circuit 9106 side for example.

A means for realizing an optical power splitter in the PIC (Photonic Integrated Circuit) generally includes a multimode interference circuit or a directional coupler. However, the multimode interference circuit designed to have an asymmetric branching ratio involves a disadvantage that an excessive loss is increased when compared with a design having a 50:50 symmetric branching ratio.

The multimode interference circuit having the asymmetric branching ratio is previously examined for a quartz material waveguide. According to this examination result, when compared with the 50:50 symmetric design, the higher the asymmetry property is, the more accurately the power distribution ratios to the modes of the respective orders must be controlled.

However, a disadvantage of the excessive loss has been caused because a desired distribution ratio cannot be realized due to a manufacturing error. A material system used for PIC has a further-higher refractive index than that of quartz material, thus causing a smaller tolerance to the manufacturing error and further worsening the above-described disadvantage of the excessive loss.

This disadvantage of the excessive loss undesirably causes another excessive loss because while an asymmetric branching ratio is designed in order to reduce the loss of the entire circuit by compensating the unbalanced loss depending on the path, thus inevitably failing to reduce the loss of the entire circuit.

In the case of designing an asymmetric branching ratio by using a directional coupler, the principle of the directional coupler causes another disadvantage. It is that, the directional coupler of an asymmetric branching ratio has, when compared with the directional coupler of 50:50 symmetric branching ratio, dependency on the wavelength. In this case, although the directional coupler design having the asymmetric branching ratio can reduce the loss of the entire circuit at a specific wavelength, this design cannot compensate the unbalanced loss depending on the path at another wavelength of the operation wavelength range, thus inevitably failing to reduce the loss of the entire circuit.

As described above, the polarization multiplexing optical transmission and reception circuit intended for one chip integration has a disadvantage that the use of an optical power splitter having a symmetric branching ratio causes an unbalanced loss depending on the path. When an optical power splitter having an asymmetric branching ratio is used in order to compensate for the unbalanced loss depending on the path, a disadvantage is caused in that another excessive loss is caused by the characteristic of the optical power splitter itself.

CITATION LIST

Non Patent Literature

NPL 1: Bo Zhang et al., "Practical Limits of Coherent Receivers for Unamplified 100 Gb/s Applications", Proceeding of OFC2013, OW1E.3, (2013)

SUMMARY OF INVENTION

The present invention has been made in view of the disadvantage as described above. An objective of the invention is, by using an optical power splitter having the minimum asymmetry property of the branching ratio, to compensate the unbalanced loss depending on the polarization path while distributing optimal optical power among the optical transmission and reception circuits, thereby providing a one chip-integrated optical transmission and reception circuit based on a digital coherent polarization multiplexing method that has a superior loss characteristic.

In order to solve the above disadvantage, the optical transmission and reception circuit according to the present invention can have a configuration as shown below.

(Configuration 1 of the Invention)

A polarization multiplexing optical transmission circuit, comprising:

a first optical power splitter for branching the optical power of continuous light outputted from a light source;

one polarization optical modulation circuit at the side of a path having a higher loss connected to one output of the first optical power splitter;

a second optical power splitter connected to the other output of the first optical power splitter; and the other polarization optical modulation circuit connected to one output of the second optical power splitter.

(Configuration 2 of the Invention)

In the polarization multiplexing optical transmission circuit according to Configuration 1 of the invention:

the first optical power splitter has a branching ratio "a" to the one polarization modulation circuit, the second optical power splitter has a branching ratio "b" to the other polarization modulation circuit, the light source has an optical power branching ratio "c" to the entire polarization multiplexing optical transmission circuit, and when assuming that a loss difference "d(dB)" exists between systems of the polarization modulation circuits, the "c" and "d" are given within the following ranges so that:

$$c = a + (1-a)b$$

$$10(-0.2d) < (1-a)b/a < 1$$

the branching ratios "a" and "b" of the first and second optical power splitters are determined.

(Configuration 3 of the Invention)

In the polarization multiplexing optical transmission circuit according to Configuration 2 of the invention:

the "c" and "d" are given within a range satisfying the following conditions:

$$c \geq 2/3$$

or $$c < 2/3 \text{ and } 10(-0.1d) < c.$$

(Configuration 4 of the Invention)

In the polarization multiplexing optical transmission circuit according to Configurations 1 to 3 of the invention:

the polarization multiplexing optical transmission circuit includes:

a polarization rotation circuit connected to an output of the one polarization optical modulation circuit, and a polarization beam combiner connected to the polarization rotation circuit and an output of the other polarization optical modulation circuit, and the polarization beam combiner output outputs polarization multiplexing modulation light to a transmission path.

(Configuration 5 of the Invention)

A polarization multiplexing optical transmission and reception circuit, comprising:

the polarization multiplexing optical transmission circuit according to Configurations 1 to 4 of the invention, and a polarization multiplexing optical reception circuit consisting of:

a third optical power splitter connected to another output of the second optical power splitter;

a polarization beam splitter for receiving a polarization multiplexed signal light from a transmission path;

a polarization rotation circuit connected to one output of the polarization beam splitter;

a first optical coherent mixer connected to the other output of the polarization beam splitter and one output of the third optical power splitter;

a second optical coherent mixer connected to an output of the polarization rotation circuit and the other output of the third optical power splitter;

a photo detector for receiving light outputted from the first optical coherent mixer; and a photo detector for receiving light outputted from the second optical coherent mixer.

(Configuration 6 of the Invention)

In the polarization multiplexing optical transmission and reception circuit according to Configuration 5 of the invention:

at least the polarization multiplexing optical transmission circuit is integrated on one chip.

(Configuration 7 of the Invention)

In the polarization multiplexing optical transmission and reception circuit according to Configuration 6 of the invention:

the polarization multiplexing optical reception circuit except for a photo detector is also integrated on the chip.

(Configuration 8 of the Invention)

In the polarization multiplexing optical transmission and reception circuit according to Configuration 7 of the invention:

all of the polarization multiplexing optical reception circuit including a photo detector and the light source are also integrated on the chip.

According to the present invention, an optical power splitter having a branching ratio of a smaller asymmetry property than in the conventional case can be used to compensate, while distributing optimal optical power among transmission and reception circuits, the unbalanced loss depending on the polarization path, thus realizing an integrated polarization multiplexing optical transmission and reception circuit having a superior loss characteristic.

DESCRIPTION OF EMBODIMENTS

The following section will describe an embodiment of the present invention with reference to the drawings.

First Embodiment

The following section will describe the polarization multiplexing optical transmission and reception circuit according to the first embodiment of the present invention.

Figure 4:
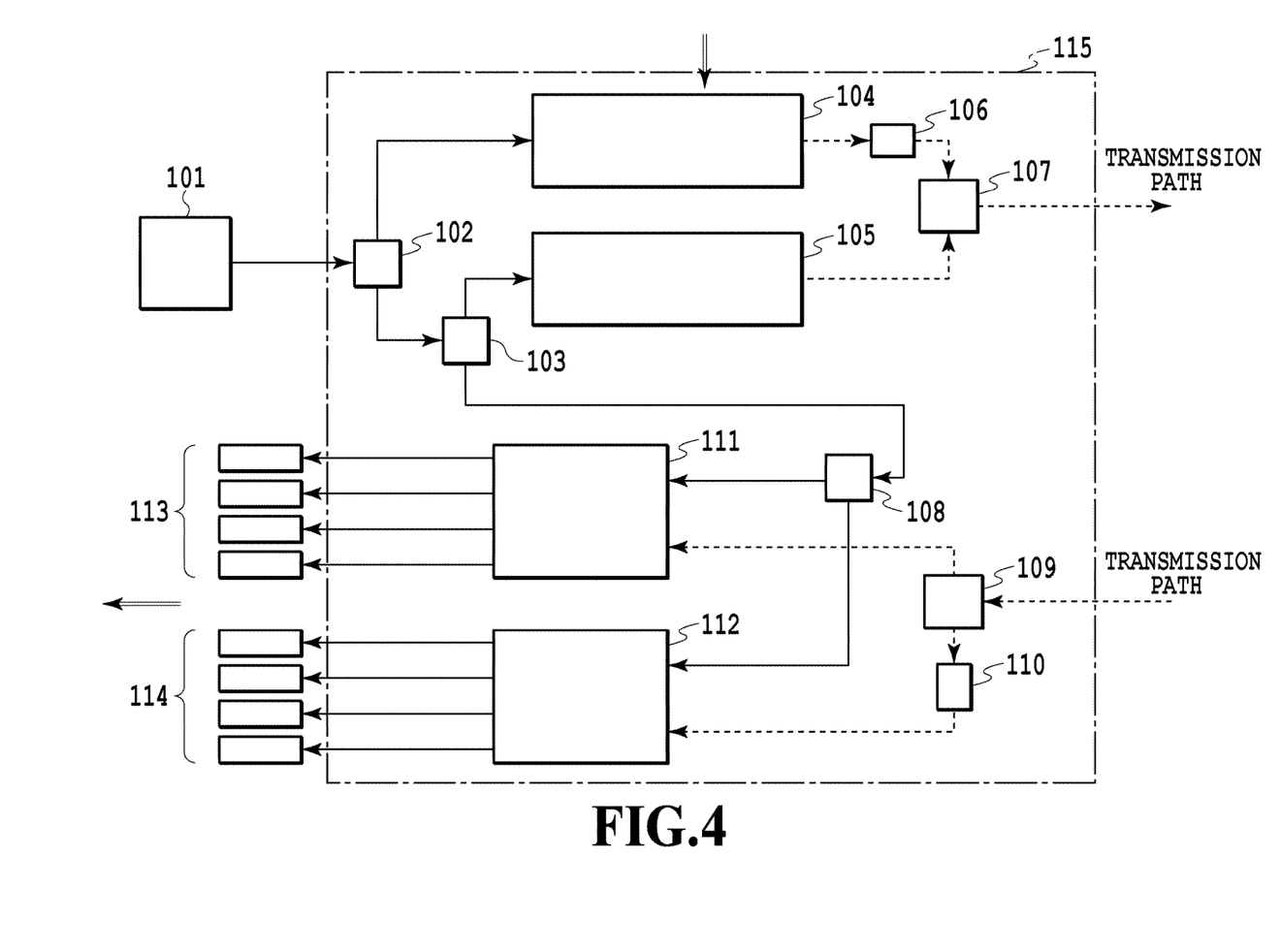
FIG. 4 illustrates the configuration of an optical transmission and reception circuit in the first embodiment of the present invention.

FIG. 4 illustrates the configuration of the polarization multiplexing optical transmission and reception circuit in the first embodiment of the present invention in which a main unit is configured on an integrated chip 115.

FIG. 4 illustrates, as the transmission-side configuration, a light source 101 for generating continuous light, the first optical power splitter 102, the second optical power splitter 103, the Y polarization optical modulation circuit 104, the X polarization optical modulation circuit 105, the first polarization rotator 106, and a polarization beam combiner 107.

FIG. 4 illustrates, as the reception-side configuration, the third optical power splitter 108, a polarization beam splitter 109, the second polarization rotator 110, an optical coherent mixer 111 functioning as the first optical demodulation circuit, an optical coherent mixer 112 functioning as the second optical demodulation circuit, and photo detectors 113 and 114.

A circuit on the integrated chip 115 is a PIC (Photonic Integrated Circuit) that is one chip-integrated using a silicon light waveguide. The one chip-integrated circuit is represented as the integrated chip 115. The PIC using the silicon waveguide also can be technically integrated with a photo detector. In this case, the photo detectors 113 and 114 are also included in the integrated chip 115. Further, the light source 101 can also be integrated.

TE polarization continuous light is inputted from the light source 101 to the transmission side. The inputted TE polarization continuous light is distributed by the first and second optical power splitters 102 and 103 to three paths of an Y polarization optical modulation circuit, an X polarization optical modulation circuit, and the reception side.

In the prior art of FIG. 1, the first optical power splitter 9102 distributes one of continuous lights from the light source 9101 to the transmission side and distributes the other to the reception side. The light distributed to the transmission side is further distributed by the second optical power splitter 9105 to the Y polarization modulation circuit and the X polarization modulation circuit.

As shown in FIG. 4, the present invention has a characteristic configuration in which one of continuous lights branched by the first optical power splitter 102 is firstly distributed directly to the Y polarization optical modulator 104 having a higher loss at the transmission side. Then, the other of the continuous light branched by the first optical power splitter 102 is further branched by the second optical power splitter 103 and is distributed, to the X polarization optical modulator 105 having a lower loss at the transmission side and to the reception side as reference light.

By specifying an order at which the continuous lights from the two optical power splitters is distributed, a higher amount of optical power can be supplied, without causing a significantly-asymmetric branching ratio, to the transmission side and to the polarization-side system having a higher loss.

For example, even when two optical power splitters both have a branching ratio of 50:50, based on a simplified calculation, the transmission side will receive the 75% of the total optical power from the light source, and the two polarization systems X and Y at the transmission side will have the optical power branching ratio of 1:2, therebetween. Therefore, even when the transmission-side polarization rotator causes the loss difference of about 3 dB between polarizations, for example, the loss difference can be well compensated.

Two polarization systems at the reception side also have a loss difference due to the polarization rotator at the reception side. However, since the reception side originally handles small optical power, an electric amplifier for amplifying the reception electric signal can be used to compensate the loss difference.

(Comparison of Branching Ratio)

The following section will describe the comparison of the branching ratio between the present invention and the conventional design, by comparing the optimal branching ratios between the corresponding first and second optical power splitters. The result shows that the present invention provides a branching ratio having a lower asymmetry property under more practical conditions.

The term "optimal branching ratio" means a branching ratio at which the unbalanced loss between a Y polarization modulator path and an X polarization modulator path can be exactly compensated. The optimal branching ratio is determined based on the following two conditions. They are the optical power branching ratio to the transmission side (the percentage of the optical power distributed to the transmission side against the total light power from the light source) and the loss difference between the polarizations (the difference of the loss in dB amount of the Y polarization modulator path higher than the loss in dB amount of the X polarization modulator path).

(Branching Ratios of First and Second Optical Power Splitters of the Present Invention)

Figure 5A:
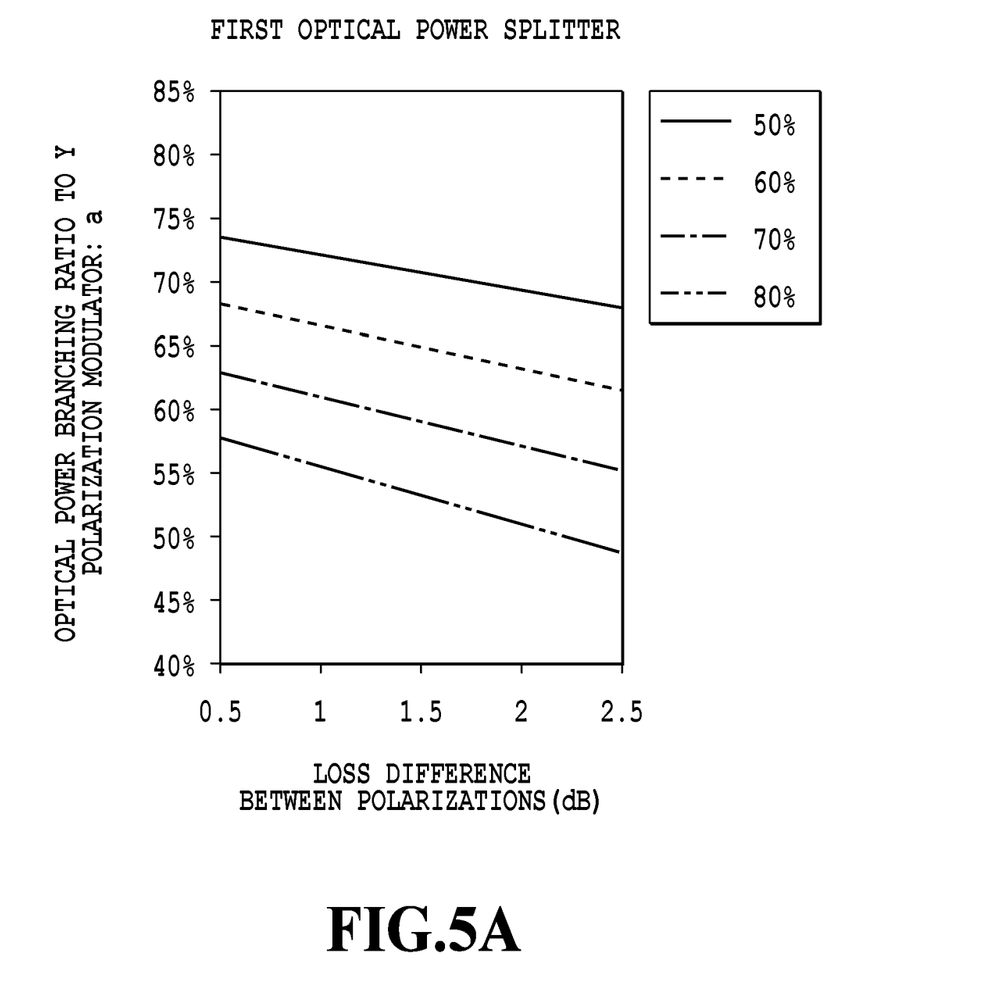
FIG. 5A illustrates the optimal branching ratio of the first optical power splitter in the first embodiment of the present invention.
Figure 5B:
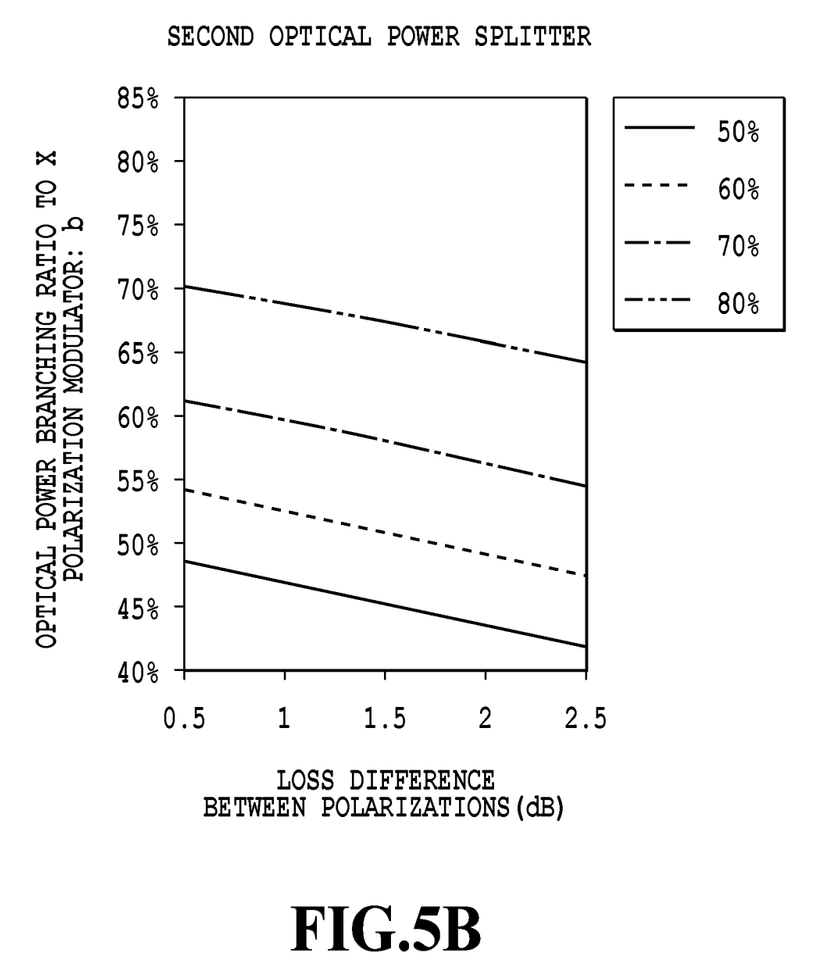
FIG. 5B illustrates the optimal branching ratio of the second optical power splitter in the first embodiment of the present invention.

FIG. 5A and FIG. 5B illustrate the optimal branching ratio of the first and second optical power splitters 102 and 103 in the present invention.

FIG. 5A illustrates the branching ratio of the first optical power splitter 102 and FIG. 5B illustrates the branching ratio of the second optical power splitter 103 ("a" and "b" in the following formulae (1) and (2)).

The horizontal axis in each of the graphs shows the conditions for the loss difference between polarizations ("d" in the following formulae (1) and (2)). The four lines correspond to the typical conditions for the optical power branching ratio to the transmission side ("c" in the following formulae (1) and (2)=50, 60, 70, and 80%), respectively.

The optimal branching ratio shown in FIG. 5 is calculated based on the following flow.

Assume the branching ratio to the Y polarization modulator in the first optical power splitter 102 is "a".

Assume the branching ratio to the X polarization modulator in the second optical power splitter 103 is "b".

Assume the optical power branching ratio from the light source to the entire transmission side is "c".

Assume the loss difference between polarizations is d(dB).

Based on the above, the following relational expressions (1) and (2) are established for "a", "b", "c", and "d".

$$c = a + (1-a)b \quad (1)$$

$$10(-0.1d) = (1-a)b/a \quad (2)$$

The values of c and d are substituted in the above two expressions to calculate "a" and (Branching Ratios of the First and Second Optical Power Splitters of the Prior Art)

Figure 6A:
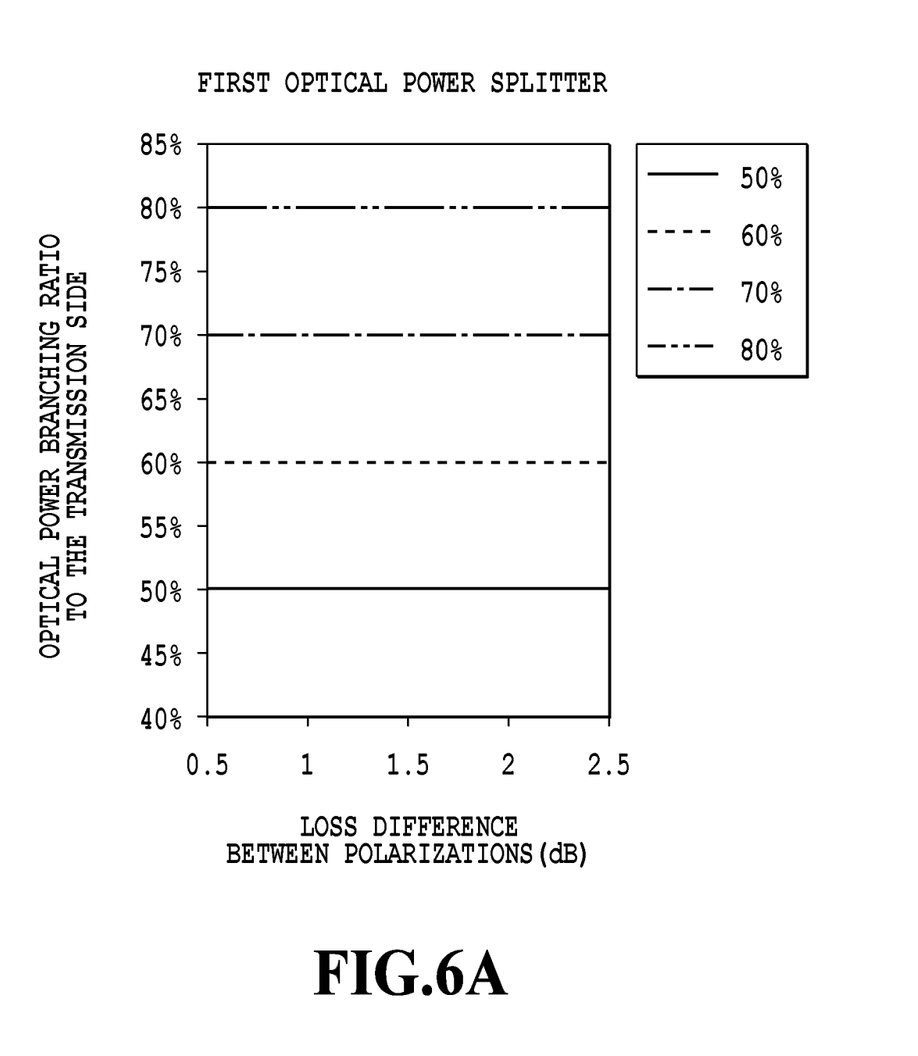
FIG. 6A illustrates the optimal branching ratio of the first optical power splitter in the prior art.
Figure 6B:
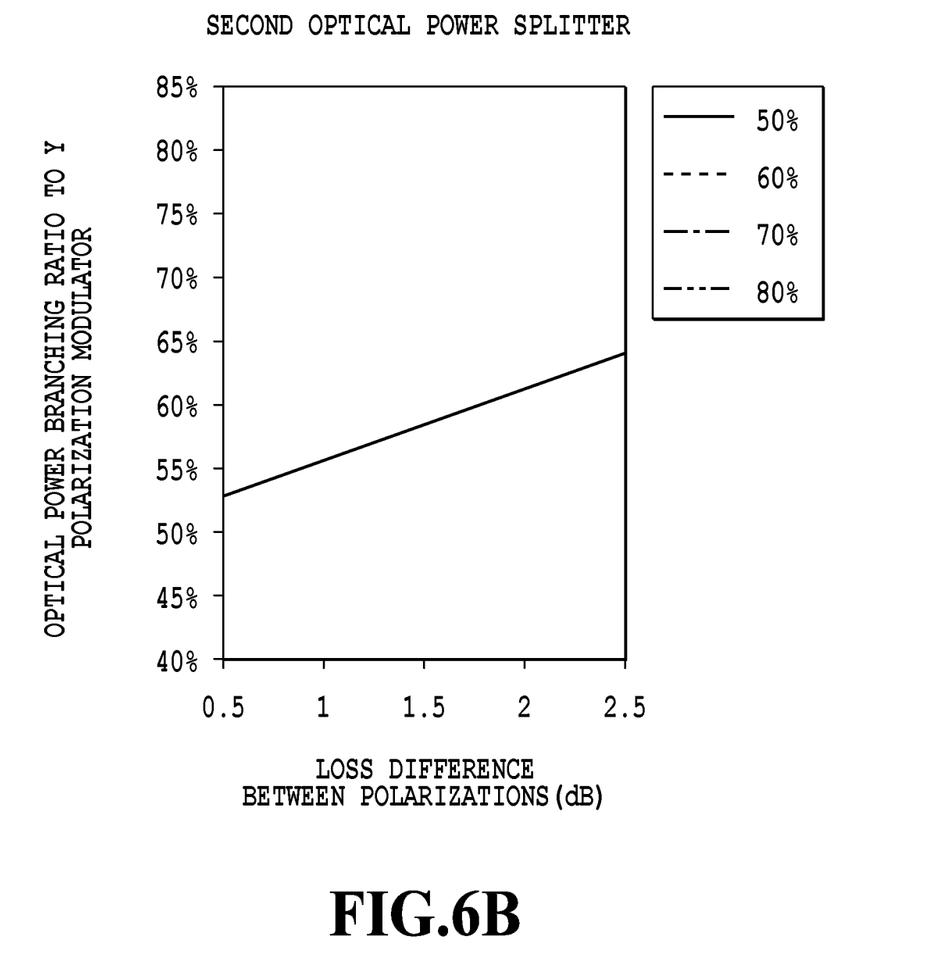
FIG. 6B illustrates the optimal branching ratio of the second optical power splitter in the prior art.

On the other hand, FIG. 6A and FIG. 6B illustrate the optimal branching ratios of the first and second optical power splitters 9102 and 9105 of the prior art shown in FIG. 2 for the comparison with FIG. 5A and FIG. 5B.

FIG. 6A illustrates the branching ratio of the first optical power splitter and FIG. 6B illustrates the branching ratio of the second optical power splitter ("a" and "b" in the following formulae (3) and (4)).

The horizontal axis of each of the graphs similarly shows the conditions for the loss difference between polarizations ("d" in the following formulae (3) and (4)). The four lines correspond to the typical conditions for the optical power branching ratio to the transmission side ("c" in the following formulae (3) and (4)=50, 60, 70, and 80%), respectively.

The optimal branching ratio shown in FIG. 6 is calculated based on the following flow.

Assume the branching ratio to the transmission side in the first optical power splitter 9102 is "a".

Assume the branching ratio to the Y polarization modulator in the second optical power splitter 9105 is "b".

Assume the optical power branching ratio from the light source to the entire transmission side is "c".

Assume the loss difference between polarizations is d(dB).

Based on the above, the following relational expressions (3) and (4) are established for "a", "b", "c", and "d".

$$c = a \quad (3)$$

$$10(-0.1d) = (1-b)/b \quad (4)$$

Based on the values of conditions "c" and "d", "a" and "b" are calculated in the above two expressions (3) and (4).

(Comparison of the Branching Ratio Between the Prior Art and the Present Invention)

Figure 7A:
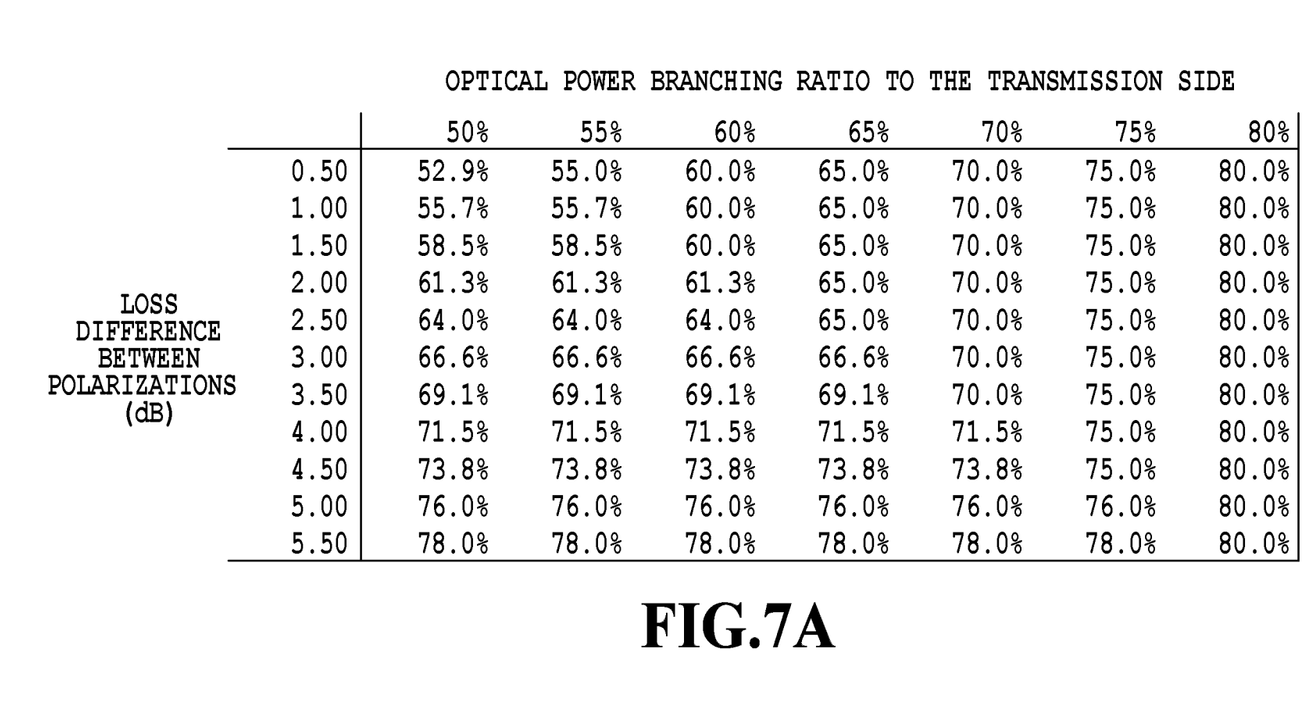
FIG. 7A illustrates the branching ratio having a higher asymmetry property among the optimal branching ratios of the first and second optical power splitters in the configuration of the prior art.
Figure 7B:
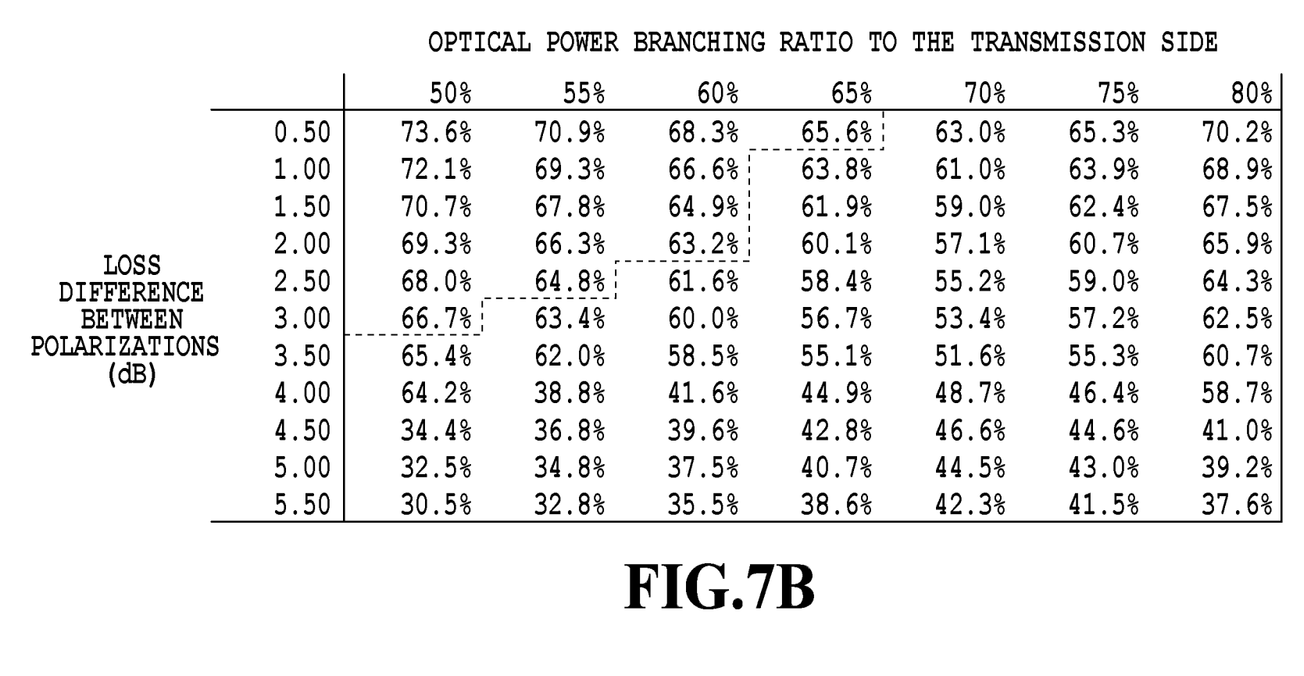
FIG. 7B illustrates the branching ratio having a higher asymmetry property among the optimal branching ratios of the first and second optical power splitters in the configuration of the present invention.

FIG. 7A and FIG. 7B are tables obtained by comparing the optimal branching ratios of the first and second optical power splitters under the respective conditions shown in FIG. 5 and FIG. 6 to select the branching ratio (a or b) of an optical power splitter having a higher asymmetry property. FIG. 7A shows such a table for the prior art while FIG. 7B shows such a table for the present invention in which the vertical axis shows the conditions for the loss difference d between polarizations and the horizontal axis shows the conditions for the optical power ratio c to the transmission side.

In the case of the present invention shown in FIG. 7B, the lower-right region divided by the dotted line shows the conditions under which the present invention shows a branching ratio of a lower asymmetry property than that of the prior art.

According to the comparison between the corresponding values between the tables shown in FIG. 7A for the prior art and FIG. 7B for the present invention, the present invention shows the optical power splitter having a branching ratio of a lower asymmetry property than in the case of the prior art in all cases where the optical power branching ratio c to the transmission side is 70% or more and in most cases where the optical power branching ratio c to the transmission side is 65%.

As described above, according to the recent examination, it is practical that the optical power from the light source is distributed at a ratio between the transmission side and the reception side of about 70:30, i.e., the optical power branching ratio to the transmission side is about 70%.

When the polarization rotator is realized by a silicon light waveguide PIC, a circuit excessive loss of about 1 to 2 dB frequently occurs.

Under the practical conditions for the optical power branching ratio to the transmission side and the loss difference between polarizations, the optical receiver-transmitter of the present invention can compensate, when compared with the conventional design, the unbalanced loss depending on the path using an optical power splitter having a branching ratio of a lower asymmetry property.

(Regarding the Range of the Branching Ratio)

In the above illustrative example, the conditions for the formula (2) were obtained by examining the optimal branching ratio of two optical power splitters. However, when the ratio of the power branched to the X path and the Y path (a:(1−a)b) falls between an equal ratio (1:1) and a ratio for compensating the double of the loss d (1:10(−0.2d)), then the loss difference between the X path and the Y path at the output will be lower than d(dB), thus providing improvement than in the case of the prior art.

Thus, the formula (2) can be expanded to an inequality expression as shown below.

$$10(-0.2d) < (1-a)b/a < 1 \quad (5)$$

Then, the value "c" and "d" may be given in the expression to determine, under the preconditions of the formula (1), the branching ratios "a" and "b" of the two optical power splitters may be determined within a range satisfying this inequality expression (5).

Within this range, when (1−a)b/a=10(−0.1d) is established, the original formula (2) is obtained as an optimal condition under which the loss difference d is completely compensated.

When we consider the effective range of the two preconditions concerning the optical power branching ratio "c" to the entire transmission side and the loss difference d(dB) between polarizations, the technique of the present invention is effectively used under conditions in which the branching ratio of the optical power splitter (of the more asymmetric one among the two splitters) is more symmetric (a branching ratio of 50%).

These conditions as described above are considered as shown below.

[1] when $c \geq 2/3$ is established (the present invention is always effective regardless of "d") (6)

or

[2] when $c < 2/3$ and $10(-0.1d) < c$ are established (7).

As is clear from FIG. 7B, the technique of the present invention is effective (or the asymmetry property is reduced) under the above conditions.

Second Embodiment

Figure 8:
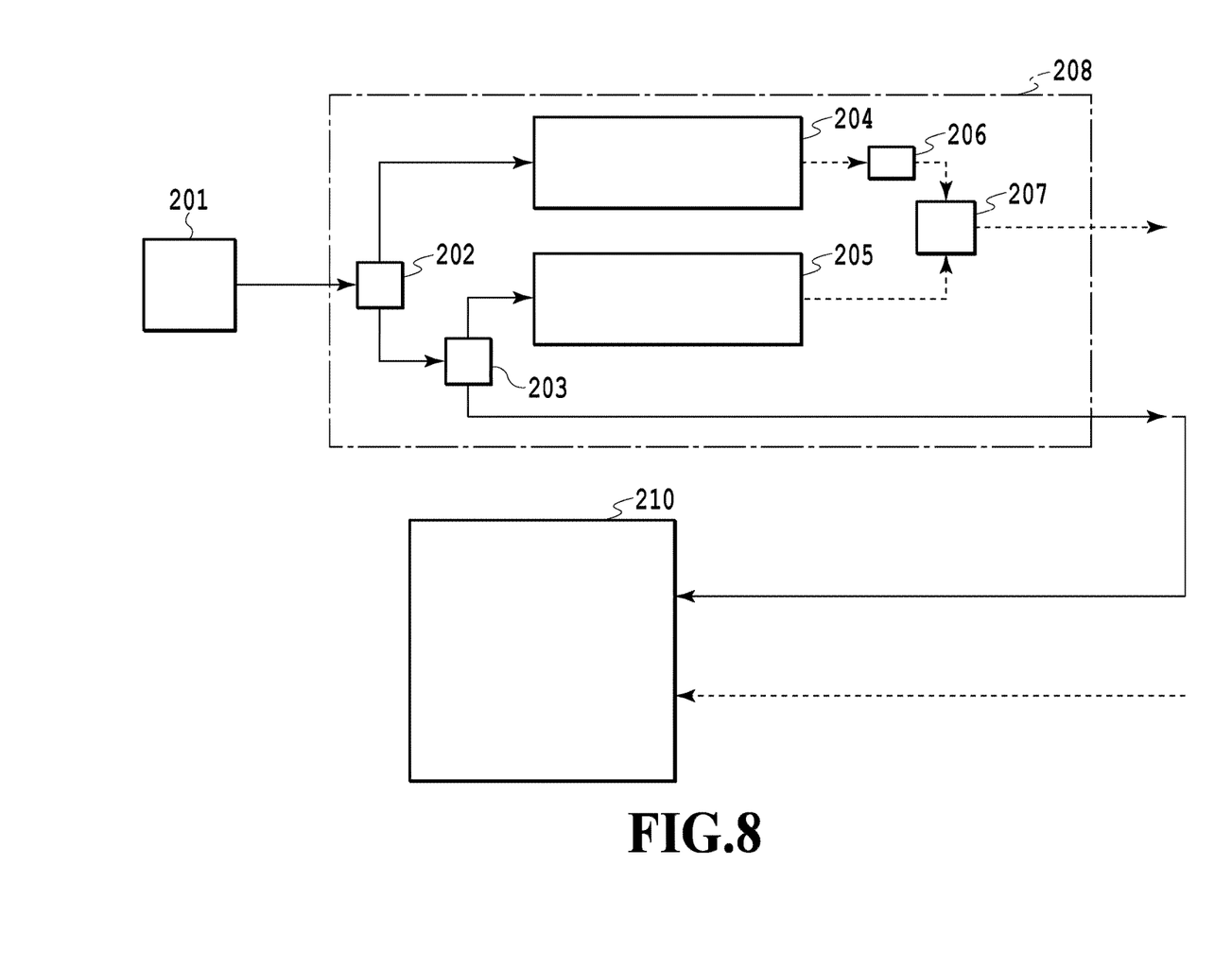
FIG. 8 illustrates the configuration of the optical transmission and reception circuit in the second embodiment of the present invention.

The following section will describe the optical transmission and reception circuit according to the second embodiment of the present invention shown in FIG. 8. The second embodiment has a similar effect as that of the first embodiment. In the second embodiment, only an optical transmission circuit 208 is the integrated circuit in one chip and an optical reception circuit 210 is a separated circuit using the prior art.

FIG. 8 illustrates a light source 201 generating continuous light, the first optical power splitter 202, the second optical power splitter 203, a Y polarization optical modulation circuit 204, an X polarization optical modulation circuit 205, the first polarization rotator 206, and a polarization beam combiner 207.

The optical transmission circuit 208 is a one chip-integrated PIC using a silicon light waveguide. The one chip-integrated circuit is represented by the optical transmission circuit 208.

The optical reception circuit 210 can be a general coherent optical demodulator having a signal light input and a local light input.

TE polarization continuous light is inputted from the light source 201 to the transmission side. The inputted TE polarization continuous light is distributed by the first and second optical power splitters 202 and 203 to three paths of the Y polarization optical modulation circuit 204, the X polarization optical modulation circuit 205, and the optical reception circuit 210.

As in the first embodiment, the second embodiment has a characteristic configuration in which one of continuous lights branched by the first optical power splitter 202 is firstly distributed directly to the Y polarization optical modulator 204 having a higher loss at the transmission side. Then, the other of the continuous lights is further distributed by the second optical power splitter 203 to the X polarization optical modulator 205 and the optical reception circuit 210.

Light distributed to the reception circuit is once outputted to the exterior of the integrated chip of the optical transmission circuit 208 and is connected to the local light input of the optical reception circuit 210.

The present embodiment is similar to the first embodiment in that, under the practical conditions for the optical power branching ratio to the transmission side and the loss difference between polarizations, an optical power splitter having a branching ratio of a lower asymmetry property can be used to compensate the unbalanced loss depending on the path when compared with the conventional design.

As described above, the first and second embodiments described the optical modulation circuit at the transmission side and the optical demodulation circuit at the reception side. The invention of this application is based on a concept that an optical power splitter having a branching ratio of a lower asymmetry property is used to compensate the unbalanced loss depending on a path under the conditions of the optical power branching ratio to the transmission side and the loss difference between polarizations at the transmission side. Thus, the invention of this application is not limited to the configuration of the above embodiment.

INDUSTRIAL APPLICABILITY

As described above, the present invention allows the use of an optical power splitter having a branching ratio of a lower asymmetry property than in the conventional design to compensate, while distributing appropriate and optimal optical power among transmission and reception circuits, the unbalanced loss depending on the polarization path of the transmission circuit, thus realizing an optical transmission and reception circuit having a superior loss characteristic.

The invention claimed is:

1. A polarization multiplexing optical transmission circuit, comprising:
   a first optical power splitter for branching an optical power of continuous light outputted from a light source;
   a first polarization optical modulation circuit at a side of a path having a higher loss connected to a first output of the first optical power splitter;
   a second optical power splitter connected to a second output of the first optical power splitter; and
   a second polarization optical modulation circuit at a side of a path having a lower loss connected to one output of the second optical power splitter.

2. The polarization multiplexing optical transmission circuit according to claim 1, wherein:
   the first optical power splitter has a branching ratio "a" to the first polarization optical modulation circuit,
   the second optical power splitter has a branching ratio "b" to the second polarization optical modulation circuit,
   the light source has an optical power branching ratio "c" to the entire polarization multiplexing optical transmission circuit, and
   when assuming that a loss difference "d(dB)" exists between systems of the polarization optical modulation circuits, the "c" and "d" are given within the following ranges so that:

$$c = a + (1-a)b$$

$$10^{(-0.2d)} < (1-a)b/a < 1$$

the branching ratios "a" and "b" of the first and second optical power splitters are determined.

3. The polarization multiplexing optical transmission circuit according to claim 2, wherein:
   the "c" and "d" are given within a range satisfying the following conditions:

$$c \geq 2/3$$

or $$c < 2/3 \text{ and } 10^{(-0.1d)} < c.$$

4. The polarization multiplexing optical transmission circuit according to claim 1, comprising:
   a polarization rotation circuit connected to an output of the first polarization optical modulation circuit, and
   a polarization beam combiner connected to the polarization rotation circuit and an output of the second polarization optical modulation circuit, wherein
   the polarization beam combiner outputs polarization multiplexing modulation light to a transmission path.

5. A polarization multiplexing optical transmission and reception circuit, comprising:
   a polarization multiplexing optical transmission circuit comprising:
   a first optical power splitter for branching the optical power of continuous light outputted from a light source;
   one polarization optical modulation circuit at the side of a path having a higher loss connected to one output of the first optical power splitter;
   a second optical power splitter connected to the other output of the first optical power splitter; and
   the other polarization optical modulation circuit connected to one output of the second optical power splitter, and a polarization multiplexing optical reception circuit comprising:
  a third optical power splitter connected to another output of the second optical power splitter;
  a polarization beam splitter that a polarization multiplexed signal light is inputted from a transmission path;
  a polarization rotation circuit connected to one output of the polarization beam splitter;
  a first optical coherent mixer connected to the other output of the polarization beam splitter and one output of the third optical power splitter;
  a second optical coherent mixer connected to an output of the polarization rotation circuit and the other output of the third optical power splitter;
  a photo detector for receiving light outputted from the first optical coherent mixer; and
  a photo detector for receiving light outputted from the second optical coherent mixer.

6. The polarization multiplexing optical transmission and reception circuit according to claim 5, wherein:
  at least the polarization multiplexing optical transmission circuit is integrated on one chip.

7. The polarization multiplexing optical transmission and reception circuit according to claim 6, wherein:
  the polarization multiplexing optical reception circuit except for the photo detectors is also integrated on the chip.

8. The polarization multiplexing optical transmission and reception circuit according to claim 7, wherein:
  all of the polarization multiplexing optical reception circuit including the photo detectors and the light source is also integrated on the chip.

9. The polarization multiplexing optical transmission and reception circuit according to claim 5, wherein:
  the first optical power splitter has a branching ratio "a" to the one polarization optical modulation circuit,
  the second optical power splitter has a branching ratio "b" to the other polarization optical modulation circuit,
  the light source has an optical power branching ratio "c" to the entire polarization multiplexing optical transmission circuit, and
  when assuming that a loss difference "d(dB)" exists between systems of the polarization optical modulation circuits, the "c" and "d" are given within the following ranges so that:

$$c = a + (1-a)b$$

$$10^{(-0.2d)} < (1-a)b/a < 1$$

the branching ratios "a" and "b" of the first and second optical power splitters are determined.

10. The polarization multiplexing optical transmission and reception circuit according to claim 9, wherein:
  the "c" and "d" are given within a range satisfying the following conditions:

$$c \geq 2/3$$

or $$c < 2/3 \text{ and } 10^{(-0.1d)} < c.$$

11. The polarization multiplexing optical transmission and reception circuit according to claim 5, comprising:
  a polarization rotation circuit connected to an output of the one polarization optical modulation circuit, and
  a polarization beam combiner connected to the polarization rotation circuit and an output of the other polarization optical modulation circuit, wherein the polarization beam combiner outputs polarization multiplexing modulation light to a transmission path.

* * * * *